United States Patent
Amrutkar et al.

(10) Patent No.: US 10,120,882 B2
(45) Date of Patent: Nov. 6, 2018

(54) METHODS, SYSTEMS, AND MEDIA FOR STORING INFORMATION ASSOCIATED WITH CONTENT PRESENTED ON A MEDIA PRESENTATION DEVICE

(71) Applicant: Google LLC, Mountain View, CA (US)

(72) Inventors: Chaitrali Amrutkar, Mountain View, CA (US); Peng Guan, San Jose, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 15/046,126

(22) Filed: Feb. 17, 2016

(65) Prior Publication Data
US 2017/0235768 A1 Aug. 17, 2017

(51) Int. Cl.
G06F 17/00 (2006.01)
G06F 17/30 (2006.01)
G06F 3/0484 (2013.01)

(52) U.S. Cl.
CPC .... *G06F 17/30268* (2013.01); *G06F 3/04842* (2013.01); *G06F 17/30017* (2013.01); *G06F 17/3028* (2013.01); *G06F 17/30274* (2013.01); *G06F 17/30781* (2013.01)

(58) Field of Classification Search
CPC ........... G06F 17/3082; G06F 17/30864; G06F 17/30964; G06F 17/241
See application file for complete search history.

(56) References Cited

U.S. PATENT DOCUMENTS

| 2005/0149978 | A1 | 7/2005 | Narita et al. |
| 2009/0158222 | A1 | 6/2009 | Kerr et al. |
| 2010/0169786 | A1* | 7/2010 | O'Brien ............ G06F 17/30817 715/738 |
| 2011/0295851 | A1 | 12/2011 | El-Saban et al. |
| 2014/0146231 | A1 | 5/2014 | Lin et al. |
| 2015/0189347 | A1 | 7/2015 | Oztaskent et al. |

FOREIGN PATENT DOCUMENTS

WO 2015200531 12/2015

OTHER PUBLICATIONS

International Search Report and Written Opinion dated Mar. 9, 2017 in International Patent Application No. PCT/US2016/065529.

* cited by examiner

*Primary Examiner* — Truong Vo
(74) *Attorney, Agent, or Firm* — Byrne Poh LLP

(57) ABSTRACT

Methods, systems, and media for performing personalized actions on mobile devices associated with a media presentation device are provided. In some implementations, the method comprises: determining that a mobile device is associated with a media presentation device, wherein the media presentation device is in an operating mode that presents a sequence of images; receiving a user command that indicates interest in an image from the sequence of images; determining metadata associated with the image; causing the metadata to be stored with a representation of the image and a user account identifier; receiving a request to review saved image information corresponding to one or more images in which the user command indicative of interest has been received; and, causing a user interface element to be presented that allows a user of the mobile device to navigate through the saved image information.

19 Claims, 6 Drawing Sheets

METHODS, SYSTEMS, AND MEDIA FOR STORING INFORMATION ASSOCIATED WITH CONTENT PRESENTED ON A MEDIA PRESENTATION DEVICE

TECHNICAL FIELD

The disclosed subject matter relates to methods, systems, and media for storing information associated with content presented on a media presentation device.

BACKGROUND

While consuming media content being displayed on a television device, a viewer of the media content is often interested in information relating to the media content, such as additional information about a location related to the media content, information about a topic related to the media content, etc. For example, the viewer may want to search for additional information about an actor seen in a movie or about locations that are shown in a documentary.

Search engines allow the viewer to search on the Internet for resources, which include webpages, images, video content, and audio content. A typical search engine provides a web page for entering search terms, where the search terms are inputted by the viewer. Search results conducted for particular search terms are provided to the viewer. Moreover, with the advent of mobile devices, the use of mobile search engines has increased. For example, using a mobile device, the viewer may perform a search and browse through Internet content while watching the television program.

Text-based search engines, however, may be somewhat limited for this user. In an example where the user wants to learn the name of a particular actor or actress in a movie and obtain additional information about the particular actor or actress, the user may attempt to obtain this information by finding the name of the movie (e.g., from a program guide, from an online television guidance website, from a printed guide, etc.) and searching for the movie by inputting it into a mobile search engine. The user then clicks through various search results to find a webpage containing information relating to the movie (e.g., an online website containing information relating to movies and television programs), accesses the webpage, and searches through the webpage to find information relating to the particular actor or actress. If the user is able to find the actor or actress on the webpage, the user accesses another page on the website relating to the particular actor or actress and scans through this page to find the desired information about the particular actor or actress. This is a time consuming procedure for the user. Moreover, this may cause the user to miss a substantial portion of the television program or to pause the television program to obtain such information via this procedure.

Accordingly, new methods, systems, and media for storing information associated with content presented on a media presentation device are desirable.

SUMMARY

In accordance with some implementations of the disclosed subject matter, mechanisms for storing information associated with content presented on a media presentation device are provided.

In accordance with some implementations of the disclosed subject matter, a method for obtaining information relating to presented content is provided, the method comprising: determining that a mobile device is associated with a media presentation device over a communications network, wherein the media presentation device is in an operating mode that presents a sequence of images; receiving a user command that indicates interest in an image from the sequence of images being presented on the media presentation device; determining metadata associated with the image from the sequence of images being presented on the media presentation device; causing the metadata associated with the image to be stored with a representation of the image from the sequence of images and a user account identifier corresponding to a user of the mobile device; receiving a request to review saved image information corresponding to one or more images in which the user command indicative of interest has been received; and in response to receiving the request, causing a user interface element to be presented that allows a user of the mobile device to navigate through the saved image information, wherein the user interface element includes at least the representation of the image from the sequence of images and information relating to the image from the sequence of images.

In accordance with some implementations of the disclosed subject matter, a system for obtaining information relating to presented content is provided, the system comprising a hardware processor that is configured to: determine that a mobile device is associated with a media presentation device over a communications network, wherein the media presentation device is in an operating mode that presents a sequence of images; receive a user command that indicates interest in an image from the sequence of images being presented on the media presentation device; determine metadata associated with the image from the sequence of images being presented on the media presentation device; cause the metadata associated with the image to be stored with a representation of the image from the sequence of images and a user account identifier corresponding to a user of the mobile device; receive a request to review saved image information corresponding to one or more images in which the user command indicative of interest has been received; and in response to receiving the request, cause a user interface element to be presented that allows a user of the mobile device to navigate through the saved image information, wherein the user interface element includes at least the representation of the image from the sequence of images and information relating to the image from the sequence of images.

In accordance with some implementations of the disclosed subject matter, a non-transitory computer-readable medium containing computer executable instructions that, when executed by a processor, cause the processor to perform a method for obtaining information relating to presented content is provided, the method comprising: determining that a mobile device is associated with a media presentation device over a communications network, wherein the media presentation device is in an operating mode that presents a sequence of images; receiving a user command that indicates interest in an image from the sequence of images being presented on the media presentation device; determining metadata associated with the image from the sequence of images being presented on the media presentation device; causing the metadata associated with the image to be stored with a representation of the image from the sequence of images and a user account identifier corresponding to a user of the mobile device; receiving a request to review saved image information corresponding to one or more images in which the user command indicative of interest has been received; and in response to receiving the request, causing a user interface element to be presented that allows a user of the mobile device to navigate through the saved image information, wherein the user interface element includes at least the representation of the image from the sequence of images and information relating to the image from the sequence of images.

In accordance with some implementations of the disclosed subject matter, a system for obtaining information relating to presented content is provided, the system comprising: means for determining that a mobile device is associated with a media presentation device over a communications network, wherein the media presentation device is in an operating mode that presents a sequence of images; means for receiving a user command that indicates interest in an image from the sequence of images being presented on the media presentation device; means for determining metadata associated with the image from the sequence of images being presented on the media presentation device; means for causing the metadata associated with the image to be stored with a representation of the image from the sequence of images and a user account identifier corresponding to a user of the mobile device; means for receiving a request to review saved image information corresponding to one or more images in which the user command indicative of interest has been received; and means for causing a user interface element to be presented that allows a user of the mobile device to navigate through the saved image information in response to receiving the request, wherein the user interface element includes at least the representation of the image from the sequence of images and information relating to the image from the sequence of images.

In some implementations, the system further comprises means for determining the operating mode of the media presentation device, wherein the sequence of images is caused to be presented on the media presentation device in response to determining that the operating mode of the media presentation device is a background mode and wherein media content is caused to be presented on the media presentation device in response to determining that the operating mode of the media presentation device is a playback mode.

In some implementations, the system further comprises means for receiving an indication that the mobile device is associated with the media presentation device over a wireless communications network.

In some implementations, the means for receiving the user command that indicates interest in the image from the sequence of images further comprises: means for receiving audio data that includes ambient sounds in an environment in which the sequence of images is being presented; and means for identifying a voice input that includes a particular sequence of words from the audio data that corresponds to a request to obtain information associated with the image being presented on the media presentation device.

In some implementations, the means for determining the metadata associated with the image from the sequence of images being presented on the media presentation device further comprises: means for obtaining timing information associated with the received user command; means for transmitting, to the media presentation device, a request for image information associated with the image being presented on the media presentation device based on the timing information; means for receiving, from the media presentation device, the image information; and means for transmitting a search query for supplemental content, wherein the search query includes the image information.

In some implementations, the system further comprises means for causing a confirmation interface to be presented that confirms the interest in the image from the sequence of images being presented on the media presentation device, wherein the confirmation interface causes the request for image information to be transmitted to the media presentation device.

In some implementations, the system further comprises means for selecting a subset of metadata from the metadata associated with the image, wherein the subset of metadata and an image identifier that corresponds to the representation of the image are stored in a table associated with the user account identifier.

In some implementations, the means for receiving the request to review saved image information further comprises means for determining that a browser interface authenticated with credentials corresponding to the user account identifier has been accessed, wherein the user interface elements is caused to be presented in the browser interface.

In some implementations, the system further comprises: means for receiving a user selection of the user interface element that is presenting the representation of the image from the sequence of images and the information relating to the image from the sequence of images; and means for causing the browser interface to access a source of the information relating to the image.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
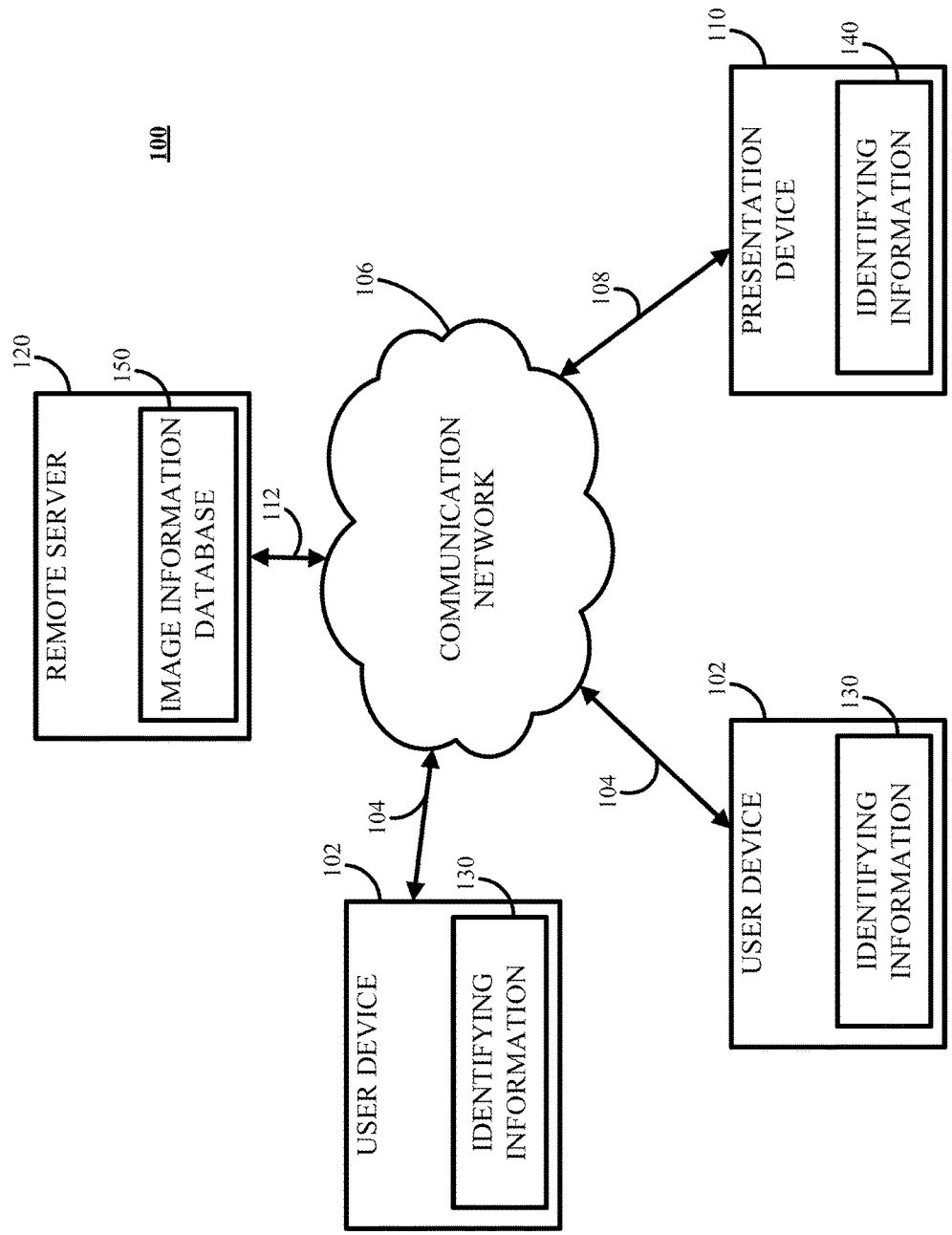
FIG. 1 shows an example of a generalized schematic diagram of a system on which the mechanisms for storing information associated with content presented on a media presentation device as described herein can be implemented in accordance with some implementations.

In accordance with some implementations, as described in more detail below, mechanisms, which can include methods, systems, and/or computer readable media, for storing information associated with content presented on a media presentation device are provided.

In some implementations, a media presentation device, such as a digital media receiver or media streaming device, can request content to be presented when the media presentation device is on and outputting video data but lacks image and/or video content to be presented. For example, when the media presentation device first starts (e.g., before any content is requested for presentation), after a predetermined period of time has elapsed with no activity, etc., the media presentation device can request content to be presented. In such an example, content can be, for example, a sequence or a slideshow of images. In a more particular example, in a background operating mode, the media presentation device can execute an application that retrieves and presents images or other media content until a presentation request is received (e.g., present a particular media content item, launch a media content provision service, etc.).

Upon being interested in an image being presented on the media presentation device, the mechanisms can detect a user command to save image-related information associated with the presented image. In response to detecting the corresponding user command, the mechanisms can retrieve at least image identifying information from the media presentation device based on timing information associated with the user command. For example, the media presentation device can respond to a request for image information with an image identifier and image metadata associated with an image presented on the media presentation device at the time the user command was detected.

The mechanisms can store the image-related information along with user identifying information associated with a user device in an image database. This can, for example, allow the user to review and/or navigate through image-related information via a generated user interface at a later time, where a user-selected portion of the user interface can provide the user with an opportunity to review additional or supplemental content obtained using the image-related information. This can also, for example, allow the user to share saved image-related information corresponding to images of interest that were presented on the media presentation device with other users (e.g., users that are connected in a social sharing service with the user of the user device).

It should be noted that, although the implementations described herein generally relate to storing and presenting image information associated with an image of interest from a sequence of images presented on a media presentation device, this is merely illustrative. Any suitable content identifier can be obtained in response to receiving a suitable user command and metadata and other information pertaining to the content associated with the content identifier can be stored for later review. For example, in response to receiving a suitable user command during the presentation of video content being presented on a media presentation device (e.g., while the media presentation device is detected as being in an active mode), metadata and other information pertaining to the video content being presented on the media presentation device can be stored for later review along with a representation of the video content (e.g., an authorized cover image corresponding to the video content). In a more particular example, the timing information associated with the user command can be used to transmit a request to the content provider or any other suitable source to obtain metadata and other information associated with the portion of video content presented at the time of the user command.

These and other features are further described in connection with FIGS. 1-14.

FIG. 1 shows an example 100 of a generalized schematic diagram of a system on which the mechanisms for storing information associated with content presented on a media presentation device as described herein can be implemented in accordance with some implementations. As illustrated, system 100 can include one or more user devices 102. User devices 102 can be local to each other or remote from each other. User devices 102 can be connected by one or more communications links 104 to a communication network 106 that can be linked to a server 120 via a communications link 112.

Although three user devices 102 are shown in FIG. 1 to avoid over-complicating the drawing, any suitable number of these devices, and any suitable types of these devices, can be used in some implementations.

System 100 can include one or more presentation devices 110. Presentation devices 110 can be local to each other or remote from each other. Presentation devices 110 can be connected by one or more communications links 108 to communication network 106 that can be linked to server 120 via communications link 112 and/or user devices 102 via communications link 104.

System 100 can include one or more servers 120. Server 120 can be any suitable server or servers for providing access to the mechanisms described herein for storing information associated with content presented on a media presentation device, such as a processor, a computer, a data processing device, or any suitable combination of such devices. For example, the mechanisms for storing information associated with content presented on a media presentation device can be distributed into multiple backend components and multiple frontend components and/or user interfaces. In a more particular example, backend components, such as mechanisms for receiving requests to associate user accounts with a presentation device, receiving metadata relating to content being presented on a presentation device, requests to present saved image information corresponding to content that was presented on a presentation device, etc., can be performed on one or more servers 120. In another particular example, frontend components, such as mechanisms for presenting content, presenting confirmation interfaces for saving image information corresponding to content that was presented on a presentation device, requesting content to be presented, identifying user devices that are present, setting user preferences, causing a user device to be associated with a presentation device, causing an action to be performed on a user device and/or presenting the results of such an action, etc., can be performed on one or more user devices 102 and/or presentation device 110.

In some implementations, each of user devices 102, presentation device 110 and server 120 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 102 can be implemented as a smartphone, a tablet computer, a wearable computer, a laptop computer, a portable game console, any other suitable computing device, or any suitable combination thereof. As another example, presentation device 110 can be implemented as a digital media receiver, a media streaming device, a game console, a set-top box, a television, a projector, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 104, 108, and 112 can be any communications links suitable for communicating data among user devices 102, presentation device 110 and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for associating multiple users with a media presentation device. For example, system 100 can include a user preferences server 120 that stores user preferences associated with one or more users and/or one or more user devices 102, an image information database server 120 that maintains one or more databases of correspondence between users and/or user devices 102 with which a particular presentation device 110 is associated (e.g., a database entry that includes a user identifier corresponding to a user account associated with user device 102, an image identifier corresponding to an image in a sequence of images being presented on presentation device 110, and metadata or any other suitable image information corresponding to the image being presented on presentation device 110), a content delivery server 120 that determines which content to cause to be presented by the particular presentation device 110, a content delivery server 120 that provides metadata or other image information corresponding to media content being displayed by presentation device 110, and/or any other suitable servers for performing any suitable functions of the mechanisms described herein.

In some implementations, user device 102 can be associated with user identifying information 130. User identifying information 130 can identify a user of user device 102 and/or can identify user device 102. For example, in some implementations, user identifying information 130 can be a token or other data associated with a user of user device 102. For example, the token or other data can identify a user associated with a particular user account of a product and/or service. In a more particular example, such a token or other information can include a string of characters that is associated with a particular email address that was used to sign in to an application on the user device. As another example, user identifying information 130 can be identifying information of user device 102, such as a MAC address, a device ID, a serial number, and/or any other suitable identifying information of user device 102. As yet another example, user identifying information 130 can be a combination of identifying information of a user and identifying information of user device 102.

In some implementations, presentation device 110 can be associated with presentation device identifying information 140. Presentation device identifying information 140 can identify a user of presentation device 110 and/or presentation device 110. For example, in some implementations, device identifying information 140 can be a token or other data associated with a user of presentation device 110. For example, the token or other data can identify a user associated with a particular user account of a product and/or service. In a more particular example, such a token or other information can include a string of characters (which can be, for example, randomly assigned) that is associated with a particular email address that was used as a credential to log in to an application executing on the presentation device. As another example, presentation device identifying information 140 can be identifying information of presentation device 110, such as a MAC address, a device ID, a serial number, and/or any other suitable identifying information of presentation device 110. As yet another example, presentation device identifying information 140 can be a combination of identifying information of a user and identifying information of presentation device 110. In some implementations, presentation device identifying information 140 can include semantically meaningful identifying information, such as a user assigned name (e.g., "UserA's Living Room Streaming Device").

In some implementations, presentation device identifying information 140 can include a persistent identifier for presentation device 110 that can be assigned based on any suitable conditions. For example, a device identifier of presentation device 110 can be assigned when presentation device 110 is initialized and/or reinitialized. In a more particular example, during initialization, presentation device 110 can contact a server to request a persistent device identifier. In some implementations, this device identifier can be assigned by the server such that each presentation device has a unique device identifier. Additionally, presentation device 110 can receive a different device identifier upon presentation device 110 being reset or otherwise reinitialized. In some implementations, such a device identifier can be used to associate user identifying information and/or any other suitable information (e.g., at a server) with presentation device 110 for later use in determining content to be presented using presentation device 110.

In some implementations, server 120 can store an image information database 150. Image information database 150 can include metadata or other image information associated with images and/or other media content being presented on presentation device 110, where such metadata or other image information can be associated with a user of a particular user device 102 (e.g., associated with user identifying information 130 of that user device 102 in response to receiving a user indication of interest in an image or other media content being displayed by presentation device 110). For example, in response to receiving a particular user command (e.g., detecting the voice command of "save that screen"), metadata and other image information corresponding to the media content being presented on presentation device 110 can be obtained and stored along with user identifying information of the user device 102 or user identifying information of presentation device 110 in image information database 150. In some implementations, metadata and/or other image information obtained from presentation device 110 can be used to transmit one or more requests to retrieve additional or supplemental content related to the image of interest. Such additional or supplemental content (or links to additional or supplemental content) can be stored along with the metadata as part of a record in image information database 150. Additionally or alternatively, in some implementations, image information database 150 can include information identifying which users are associated with which presentation devices (e.g., by relating user identifying information 130 and presentation device identifying information 140). In some implementations, information in image information database 150 can be organized using any suitable technique or combination of techniques. For example image information database 150 can be organized as a relational database.

In situations in which the mechanisms described herein collect personal information about users, or can make use of personal information, the users can be provided with an opportunity to control whether programs or features collect user information (e.g., information about cached device details on a user's user device, devices discovered on networks to which the user device is connected, an address from which a database query is sent, a social network, social actions or activities, profession, a user's preferences, or a user's current location), or to control whether and/or how to receive content from the server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some implementations, information stored in image information database can be stored such that personal information of a user is obscured. For example, user identifying information 130 and/or presentation device identifying information 140 can be an assigned identification number and/or code name and user preferences can be associated with such an identification number and/or code name.

Figure 2:
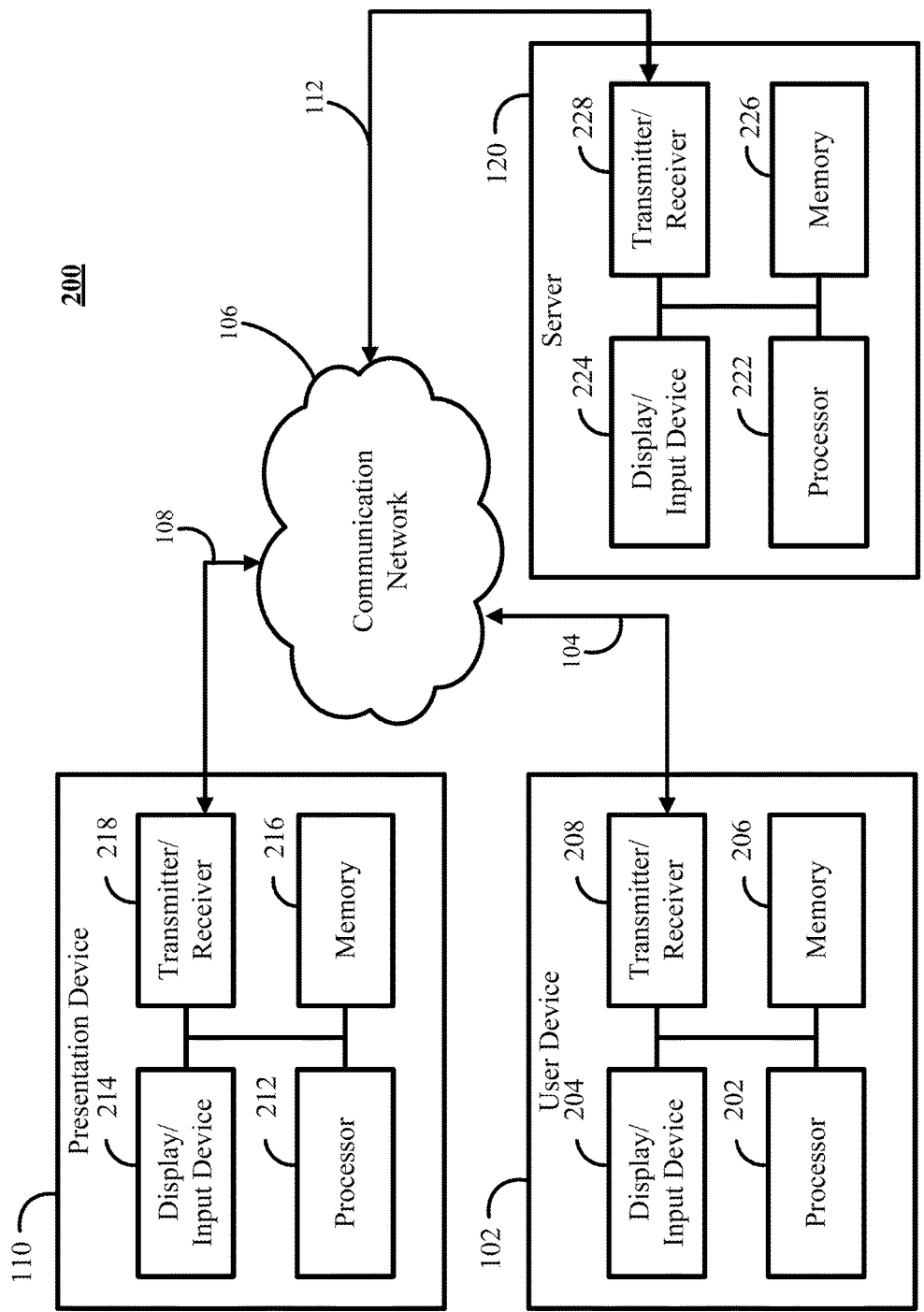
FIG. 2 shows an example of hardware that can be used to implement one or more user devices, presentation devices, and servers depicted in FIG. 1 in accordance with some implementations of the disclosed subject matter.

FIG. 2 shows an example 200 of hardware that can be used to implement one or more of user devices 102, presentation devices 110 and servers 120 depicted in FIG. 1 in accordance with some implementations of the disclosed subject matter. Referring to FIG. 2, user device 102 can include a hardware processor 202, a display/input device 204, memory 206 and a transmitter/receiver 208, which can be interconnected. In some implementations, memory 206 can include a storage device (such as a computer-readable medium) for storing a user device program for controlling hardware processor 202.

Hardware processor 202 can use the user device program to execute and/or interact with the mechanisms described herein for performing personalized actions on mobile devices associated with a media presentation device that are based on presented media content, associating multiple devices with a media presentation device, controlling presentation of the content on the media presentation device, disassociating user preferences from the media presentation device, setting user preferences, causing one or more determined actions to be performed on a user device, etc. In some implementations, the user device program can cause hardware processor 202 to, for example, interact with a device executing at least a portion of process 300 as described below in connection with FIG. 3. In some implementations, hardware processor 202 can send and receive data through communications link 104 or any other communication links using, for example, a transmitter, a receiver, a transmitter/receiver, a transceiver, or any other suitable communication device, such as transmitter/receiver 208. Display/input device 204 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 208 can include any suitable transmitter and/or receiver for transmitting and/or receiving, among other things, instructions for presenting content, instructions for setting user preferences, instructions for associating user preferences with a presentation device, etc., and can include any suitable hardware, firmware and/or software for interfacing with one or more communication networks, such as network 106 shown in FIG. 1. For example, transmitter/receiver 208 can include network interface card circuitry, wireless communication circuitry, and/or any other suitable type of communication network circuitry, one or more antennas, and/or any other suitable hardware, firmware and/or software for transmitting and/or receiving signals.

Presentation device 110 can include a hardware processor 212, a display/input device 214, memory 216 and a transmitter/receiver 218, which can be interconnected. In some implementations, memory 216 can include a storage device (such as a computer-readable medium) for storing a presentation device program for controlling hardware processor 212.

Hardware processor 212 can use the presentation device program to execute and/or interact with the mechanisms described herein for performing personalized actions on mobile devices associated with a media presentation device that are based on presented media content, associating multiple users with a media presentation device, requesting content to present based on user preferences of associated users, request and/or transmit presentation device identifying information 140, etc. In some implementations, the presentation device program can cause hardware processor 212 to, for example, interact with a device executing at least a portion of processes 300 and 600 as described below in connection with FIGS. 3 and 6, respectively. In some implementations, hardware processor 212 can send and receive data through communications link 108 or any other communication links using, for example, a transmitter, a receiver, a transmitter/receiver, a transceiver, or any other suitable communication device, such as transmitter/receiver 218. Display/input device 214 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. In some implementations, display/input device 214 of presentation device 110 can be omitted. Transmitter/receiver 218 can include any suitable transmitter and/or receiver for transmitting and/or receiving, among other things, requests for content to be presented, content to be presented, signals to determine whether one or more user devices 102 are present, etc., and can include any suitable hardware, firmware and/or software for interfacing with one or more communication networks, such as network 106 shown in FIG. 2. For example, transmitter/receiver 218 can include network interface card circuitry, wireless communication circuitry, USB input and/or output circuitry, HDMI input and/or output circuitry, and/or any other suitable type of communication network circuitry, one or more antennas, and/or any other suitable hardware, firmware and/or software for transmitting and/or receiving signals.

Server 120 can include a hardware processor 222, a display/input device 224, memory 226 and a transmitter/ receiver 228, which can be interconnected. In some implementations, memory 228 can include a storage device for storing data received through communications link 112 or through other links. The storage device can further include a server program for controlling hardware processor 222. In some implementations, memory 228 can include information stored as a result of user activity and/or activity by a presentation device (e.g., user preferences, user identifying information 130, presentation device identifying information 140, image information database 150, content to be presented, requests for content to be presented, user credentials for use in accessing content to be presented, etc.). In some implementations, the server program can cause hardware processor 222 to, for example, execute at least a portion of process 300 and 600 as described below in connection with FIGS. 3 and 6, respectively.

Hardware processor 222 can use the server program to communicate with user devices 102 and/or presentation device 110 as well as provide access to and/or copies of the mechanisms described herein. It should also be noted that data received through communications link 112 or any other communications links can be received from any suitable source. In some implementations, hardware processor 222 can send and receive data through communications link 112 or any other communications links using, for example, a transmitter, a receiver, a transmitter/receiver, a transceiver, or any other suitable communication device, such as transmitter/receiver 228. In some implementations, hardware processor 222 can receive commands and/or values transmitted by one or more user devices 102, presentation device 110, one or more other servers 120, and/or one or more users of server 120, such as a user that makes changes to adjust settings associated with the mechanisms described herein for associating multiple users with a media presentation device. Display 224 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 228 can include any suitable transmitter and/or receiver for transmitting and/or receiving, among other things, content to be presented, user preferences, user identifying information 130, presentation device identifying information 140, requests for content, etc., and can include any suitable hardware, firmware and/or software for interfacing with one or more communication networks, such as network 106 shown in FIG. 2. For example, transmitter/receiver 228 can include network interface card circuitry, wireless communication circuitry, and/or any other suitable type of communication network circuitry, one or more antennas, and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or presentation device 110. Additionally or alternatively, as described above in connection with FIG. 1, multiple servers 120 can be implemented to perform different tasks associated with the mechanisms described herein.

Figure 3:
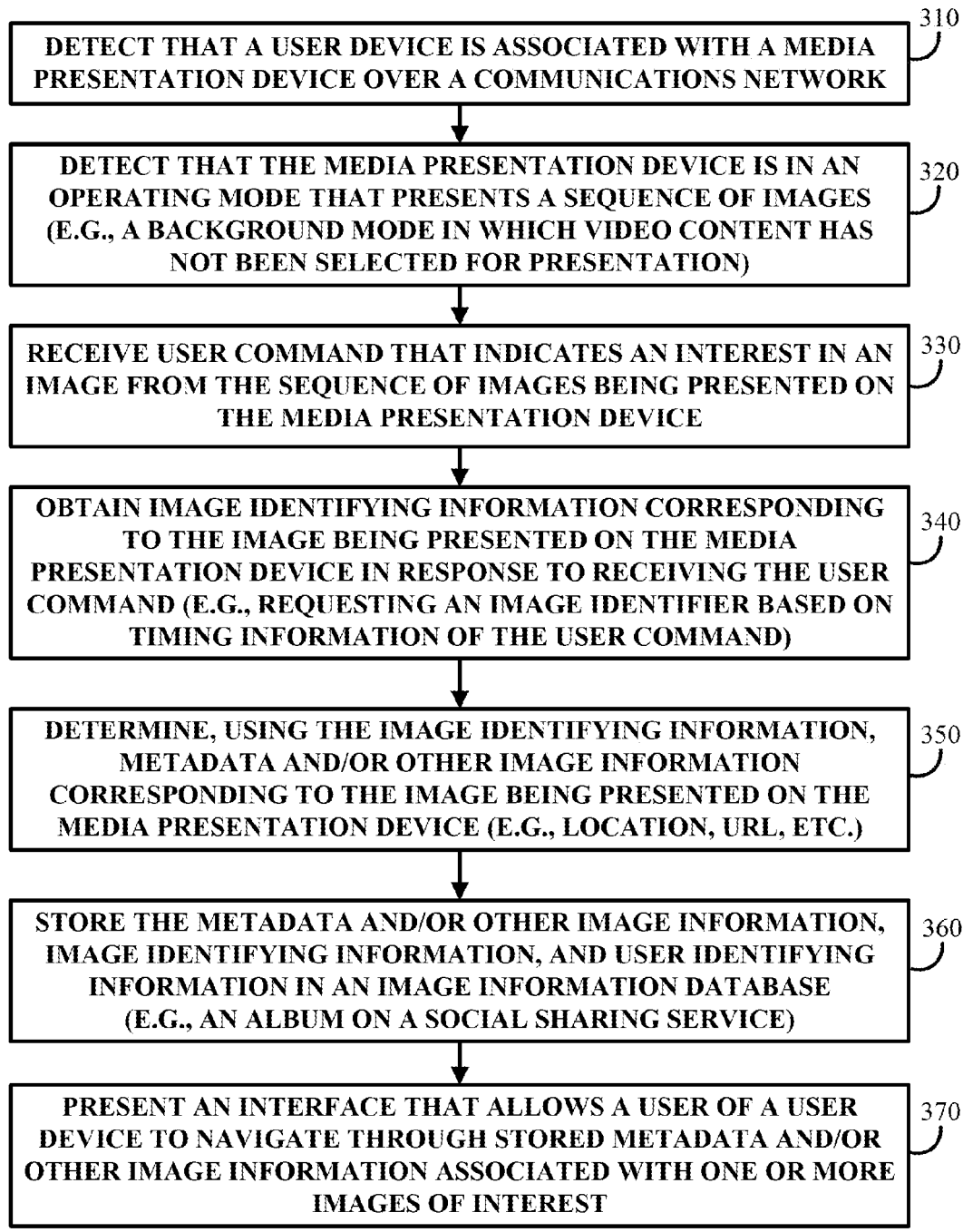
FIG. 3 shows an example of a process for storing information associated with content presented on a media presentation device in accordance with some implementations of the disclosed subject matter.

FIG. 3 shows an example 300 of a process for storing information associated with content presented on a media presentation device in accordance with some implementations of the disclosed subject matter.

It should be noted that, although the implementations described herein generally relate to storing and presenting image information associated with an image of interest from a sequence of images presented on a media presentation device, this is merely illustrative. Any suitable content identifier can be obtained in response to receiving a suitable user command and metadata and other information pertaining to the content associated with the content identifier can be stored for later review. For example, in response to receiving a suitable user command during the presentation of video content being presented on a media presentation device, metadata and other information pertaining to the video content being presented on the media presentation device can be stored for later review along with a representation of the video content (e.g., an authorized cover image corresponding to the video content). In a more particular example, during the playback of a particular video content item "Movie A," a suitable user command, such as "save this and who is this actor," and, responsive to the user command at the particular time during the playback of "Movie A," metadata and supplemental content obtaining using the metadata can be stored for the generation and presentation of recommendation card interfaces on a computing device. In some implementations, in addition to storing image-related information or other information associated with presented media content, the metadata and other information pertaining to the video content being presented on the media presentation device can also be shared with one or more users (e.g., users that have a relationship in a social sharing service with the user of the user device).

As shown in FIG. 3, process 300 can begin, at 310, by detecting that a user device, such as user device 102, is associated with a media presentation device, such as presentation device 110, over a communications network. For example, a user logged into a user account can locate a presentation device on a communications network and cause a request to associate with the presentation device (e.g., connect to UserA's living room presentation device). In a more particular example, user device 102 can cause a request to associate a user of user device 102 (e.g., based on user identifying information 130) with a particular presentation device 110 to be sent to server 120 executing at least a portion of process 300 in response to and/or as part of a request initiated by a user to present particular content on presentation device 110. Alternatively, presentation device 110 can cause a request to associate a user of user device 102 with presentation device 110 to be sent to server 120 executing at least a portion of process 300 in response to presentation device 110 receiving an instruction from such a user device 102 to perform any suitable action. As yet another example, user device 102 can cause a request to associate a user of user device 102 (e.g., based on user identifying information 130) with a particular presentation device 110 to be sent to server 120 executing at least a portion of process 300 in response to any suitable user action initiating such an association.

In some implementations, in lieu of or in addition to a user device responding to a signal from a presentation device to detect presence of user devices, the user device can transmit a signal to server 120 identifying itself as being in the presence of presentation device 110.

In a more particular example, a client application can be loaded on any suitable user device, such as a smartphone, a tablet computer, a wearable computer, etc. Once the client application is loaded, the client application can initiate presentation device discovery in some implementations. For example, presentation device discovery can be initiated on a network to which the user device is connected. In a more particular example, the client application can cause the user device to search for presentation devices on a network (e.g., a Wi-Fi network) utilizing the Discovery And Launch (DIAL) protocol. In another more particular example, a full discovery protocol can be executed that causes the computing device to send a User Datagram Protocol (UDP) multicast message on a network to which the user device is connected. In some implementations, the UDP can include an M-Search message directed to presentation devices, such as digital media renderers and/or digital media servers, digital media players, or any other suitable presentation device that outputs, processes, and/or presents media content. In some implementations, the UDP multicast message can include an address of the device sending the message (e.g., the network address of the user device), and can include a time period during which replies are to be sent. Such a time period can be any suitable time period, such as one second, two seconds, etc., and can be set based on any suitable factors.

As another example, presentation device discovery can be initiated to determine whether presentation devices are in a proximity of the user device. In another more particular example, the client application can execute a BLUETOOTH Service Discovery Protocol (SDP) and/or any other suitable SDP that allows a device to discover other devices through a short-range connection.

It should be noted that, prior to initiating presentation device discovery or performing any action on the user device, the client application can provide a user of the user device with an opportunity to provide affirmative consent or authorization to perform actions on the user device, such as detecting presentation devices connected to the user device, retrieving media content associated with the user, performing a second screen action, etc. For example, upon loading the client application on the user device, the client application can prompt the user to provide authorization for retrieving image identifying information associated with the presentation device and storing image-related information that can include the image identifying information along with user identifying information in a database. In a more particular example, in response to downloading the client application and/or loading the client application on the user device, the user can be prompted with a message that requests (or requires) that the user provide consent prior to performing these actions. Additionally or alternatively, in response to installing the client application, the user can be prompted with a permission message that requests (or requires) that the user provide consent prior to performing these actions.

In some implementations, process 300 can determine an operating mode of the media presentation device at 320. For example, it can be determined that media presentation device 110 is currently in a background operating mode in which a sequence or slideshow of images is presented on media presentation device 110. In this mode, any suitable media content, which can include one or more images, video content, audio content, text, graphics, and/or any other suitable content, can be presented by the media presentation device. In another example, it can be determined that media presentation device 110 is currently in an active mode in which media content is presented on media presentation device 110 (e.g., a movie, an audio clip, a video, etc.). Upon detecting that media presentation device 100 is in an active mode, process 300 can obtain particular types of metadata from media presentation device 110 (e.g., location metadata on where the current scene is occurring, people metadata on the actors and actresses appearing in the current scene, keyword metadata relating to the media content being presented, etc.) or can wait for a user query to determine what types of metadata to obtain from media presentation device 110. It should be noted that any suitable operating mode information can be detected—e.g., an operating mode in which only a particular type of content is presented.

In some implementations, along with the retrieval and presentation of media content, which can include one or more images, video content, audio content, text, graphics, and/or any other suitable content, metadata relating to each piece of media content can be retrieved. In some implementations, metadata can include any suitable information about the media content. For example, the metadata can include one or more topics related to the media content. In some implementations, a topic related to the media content can be "arts," "sports," "weather," "personal photos," "travel," "stocks," "news," "fashion," and/or any other suitable topic. As another example, the metadata can include any suitable information about the subject of the media content, such as a description of what is depicted in an image. As yet another example, the metadata can include any geographic information related to the media content, such as a name of a location where the media content was captured, a name of a landmark that appears in the media content, etc. In a more particular example, metadata about an image of the Eiffel Tower can include the phrases "Paris," "France," "Europe," "Eiffel Tower," etc. As still another example, the metadata can include any suitable information about one or more sources related to the media content, such as a social media post, a web page, a URI, etc.

In response to detecting that the user device is associated with the media presentation device over a communications network and in response to detecting that the media presentation device is in an operating mode that presents a sequence of images, process 300 can determine whether a request a user command indicating an interest in an image from the sequence of images has been received at 330. For example, in response to detecting that the user device is associated with the media presentation device over a communications network and in response to detecting that the media presentation device is in an operating mode that presents a sequence of images, an audio input device, such as a microphone on the user device, can be activated, where audio data is analyzed to detect a voice command indicative of a user's interest in an image being presented. In a more particular example, the voice command from the audio data can include a particular sequence of words, such as "save this image." In another more particular example, the voice command indicating the user's interest in an image can be detected after a trigger term that initiates the request, such as "OK device." It should be noted that, in some implementations, an audio input device this is a part of or connected to the media presentation device can detect the voice command from the received audio data and transmit an indication of the received voice command to the user device that is associated with the media presentation device.

In some implementations, in response to determining that the media presentation device is in a particular operating mode, process 300 can detect whether a particular user command indicating interest in a portion of media content being presented on the media playback device has been received. For example, in response to determining that the media presentation device is in a background or idle mode in which a sequence of images is being presented, process 300 can determine whether a user command, such as "save this image," has been received. In another example, in response to determining that the media presentation device is in an active mode in which media content is being presented by the media presentation device, process 300 can determine whether a user command that includes an instruction to save metadata relating to the portion of media content being presented and includes a query relating to the portion of media content being presented.

In some implementations, multiple commands can be extracted from the user command. For example, the user command of "save this and who is that actor" can be received and parsed into at least two commands—e.g., "save this" as initiating the command to save metadata and other content associated with the time that the command was received and "who is that actor" (or the terms "who" and "actor") as using the saved metadata to initiate a search to answer the query made by the user. In a more particular example, in response to receiving this user command during the presentation of "Movie A," process 300 can transmit a search query to one or more search engines including the metadata retrieved from the media presentation device that corresponds to the time that the user command was received by the mobile device. In continuing this example, the search results responsive to the search query or portions thereof can be stored. For example, the metadata and supplemental content can be stored for later review and an answer to the received query in the user command can be presented to the user in the form of a card interface on the mobile device. In another example, the search results can be used to generate card interfaces for later review on the mobile device (e.g., where the user of the mobile device can navigate through various interfaces including content saved in response to received user commands).

In some implementations, in response to detecting that the corresponding user command has been received (e.g., "OK device, save this image" from an audio input device), process 300 can obtain image identifying information from the media presentation device. For example, process 300 can, at 340, cause an application executing on the user device to transmit a request to an application executing on the media presentation device to obtain an image identifier associated with an image that was presented on the media presentation device. Such a request can include, for example, a time stamp that the user command was received. In response, the media presentation device can determine the image or other media content that was presented based on the time stamp of the request and can transmit image identifying information and any other image-related information (e.g., the metadata described above) to the user device for storage. Additionally or alternatively, the media presentation device can transmit image identifying information to the user device, where the application executing on the user device can transmit a request to a content source for additional information corresponding to the image identifying information (e.g., an image identifier, a name of the image, an artist associated with the image, a date associated with the image, a location associated with the image, etc.).

In some implementations, process 300 can request image identifying information for multiple images that were presented at or near the time stamp that the user command was received. For example, the user of the user device can be presented with multiple images and be provided with an opportunity to indicate a confirmed interest in at least one of the multiple images (e.g., by selecting one or more of the presented image representations).

In some implementations, process 300 can use the time stamp that the user command was received to allow the user of the mobile device to resume or return to the particular content being presented. For example, if the user command is received during the playback of video content, the metadata and other image-related information presented on a user interface can include a selectable option to resume or return to the video content at a playback time corresponding to the time stamp that the user command was received. In continuing this example, the selection of the selectable option by the user of the mobile device can cause the mobile device to transmit an instruction to the media playback device to resume playback of a particular media content item at a particular time (e.g., by requesting the media content item, selecting a particular playback time, and casting the content to the media playback device). In another example, where the user command was received during the presentation of a sequence of images, the selection of the selectable option by the user of the mobile device can cause the mobile device to transmit an instruction to the media playback device to display the image in the sequence of images that was being presented at the time that the user command was received.

In some implementations, process 300 can cause a confirmation interface to be presented on the user device and/or the media presentation device. For example, in response to detecting that the corresponding user command has been received (e.g., "OK device, save this image" from an audio input device), process 300 can cause a confirmation interface that prompts the user of the user device to confirm whether to initiate the storage of image-related information (e.g., a representation of the presented image, metadata associated with the presented image, links to supplemental content related to the presented image, etc.). Such image-related information can then be stored as part of an album in, for example, a social media service. Additionally or alternatively, a confirmation interface can also be presented on the media presentation device (e.g., a representation of the image can be presented adjacent to a message indicating that it will be saved and associated with the corresponding user account).

Figure 4:
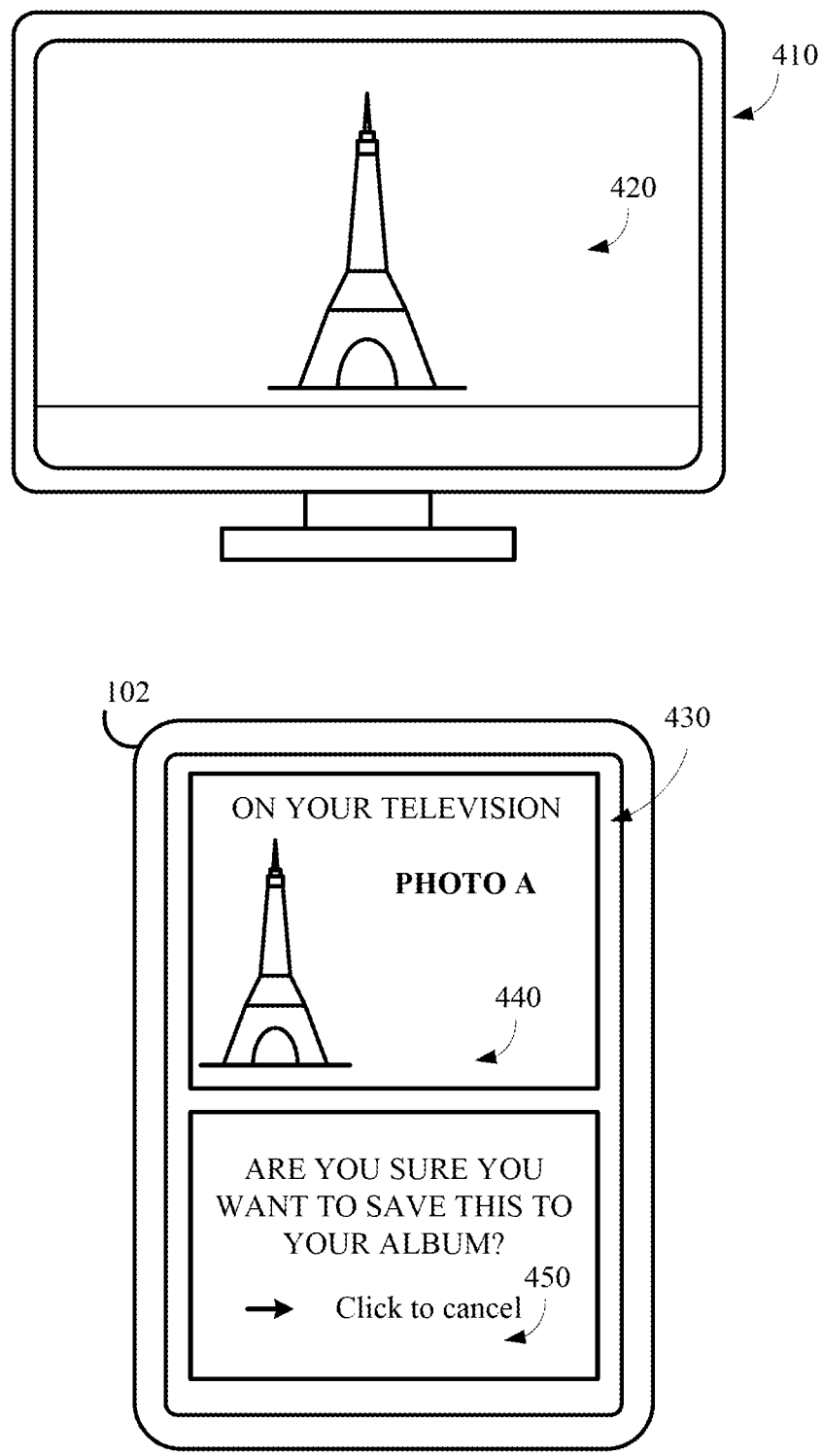
FIG. 4 shows an example of a display device presenting content and a user device presenting a confirmation interface in accordance with some implementations of the disclosed subject matter.

In a more particular example, FIG. 4 shows an illustrative example of a display device 410 presenting an image 420 and a mobile device 102 presenting a confirmation interface in response to detecting that the corresponding user command has been received. In some implementations, display device 410 can be operatively coupled to a media presentation device and/or a media presentation device can be incorporated into display device 410. For example, a media presentation device, such as a digital media receiver or media streaming device, can request content to be presented when the media presentation device is on and outputting video data but lacks image and/or video content to be presented. In some implementations, media content 420 can be default content associated with display device 410, such as a collection of images from one source or multiple sources (e.g., a locally stored database of images, images stored on the presentation device, a server, etc.). Additionally or alternatively, media content 420 can be content that has been selected for presentation based on the presence of user device 102 (e.g., user preferences associated with a user account authenticated on the user device). For example, mobile device 102 can be detected to be within a proximity of media presentation device 410 (e.g., within a predetermined proximity of media presentation device 410, on a local area network to which media presentation device 410 is connected, etc.). In some implementations, the collection of images can be displayed as a slideshow of images. For example, each of the images in the slideshow can be presented one (or many) at a time for a predetermined period of time (e.g., fifteen seconds, thirty seconds, etc.).

In continuing the above example, upon detecting that the corresponding user command to save image-related information has been received (e.g., "OK device, save my screen"), a confirmation interface 430 can be presented on a display of user device 102. As shown in FIG. 4, a card interface 430 that includes a representation 440 of the image of interest that was presented on display device 410 and a message 450 that requests that the user of user device 102 confirm the interest in saving image-related information of the image in representation 440 can be presented on a display of user interface 102. More particularly, in response to detecting an interaction with confirmation interface 430 (e.g., by selecting message 450), the storage of image-related information can be cancelled. Otherwise, in response to not detecting an interaction with confirmation interface 430 within a predetermined period of time (e.g., five seconds), the storage of image-related information corresponding to the image in representation 440 can be initiated. Alternatively, in some implementations, a selection of confirmation interface 430 can be required to initiate the storage of image-related information corresponding to the image in representation 440.

In another more particular example, upon detecting multiple commands to save metadata related to video content being presented and a query regarding the video content (e.g., "OK device, save my screen and who is the actress"), a confirmation interface can be presented that includes a representation of the video content, a timestamp of when the multiple commands were received, and a representation of the query (e.g., Did you ask—"who is the actress in this scene of Movie A?"). The confirmation interface can request that the user confirm each of the multiple commands.

In some embodiments, the confirmation interface can include a selectable option to return to the image or the position in the media content that was being presented when the user command was received. This can, for example, allow the user to review the image or review the particular scene in the media content item prior to saving metadata or obtaining supplemental content.

Referring back to FIG. 3, in some implementations, process 300 can retrieve metadata and other image-related information corresponding to the image that was presented on the media presentation device at 350. For example, upon receiving image identifying information from the media presentation device or any other suitable source, process 300 can transmit a request for supplemental content corresponding to the image that was presented on the media presentation device using the image identifying information. In a more particular example, the server can retrieve a data blob or any other suitable information about the presented image and use the data blob to retrieve metadata associated with the image.

In some implementations, the metadata can contain any suitable information relating to the presented content, such as one or more topics related to the presented content, information about the type of information contained in the presented content (e.g., an image, a video, a file type, etc.), information about the subject of the presented content (e.g., a description of what is depicted in an image), a source where the presented content originates (for example, a social media post, a web page, a URI, etc.), information about one or more users related to the presented content (e.g., a user that appears in a photo), information about one or more authors of the presented content, etc. In a more particular example, when the media content presented on the media presentation device is a landscape photograph, the metadata can include an image uniform resource locator, a location of where the photograph was taken, and artist information associated with the user that captured the photograph. In another more particular example, when the media content presented on the media presentation device is an image from a news article, the metadata can include a uniform resource locator to the news article, keywords associated with the content contained in the news article, a source that published the news article, and links to content that is related to the news article. In yet another more particular example, when the media content presented on the media presentation device is a food image from a social sharing service, the metadata can include an image uniform resource locator, a link to a recipe for making the food shown in the food image, a link to comments that have been provided on the social sharing service in response to the publication of the food image, and a link to related recipes.

In some implementations, in response to receiving image identifying information, metadata, or any other suitable image-related information from the media presentation device, process 300 can generate one or more additional requests for supplemental content to other content sources. For example, the image identifying information and/or metadata received from the media presentation device can be used to generate a search query that is transmitted to a search engine. The search results responsive to the search query can be reviewed and a portion of the search results can be stored along with the image-related information. For example, search results that are determined to have a popularity score greater than a particular threshold score can be stored with the image-related information in an image information database. In another example, search results that are determined to be relevant to the user of the user device can be stored with the image-related information in an image information database, where relevance can be based on content sources typically accessed by the user account associated with the user device, content providing services subscribed to by the user account associated with the user device, etc.

In some implementations, the search query that is transmitted to one or more search engines is generated in response to detecting a query in the user command. The search query can obtain an answer to the query detected in the user command and the corresponding search results can be obtained.

At 360, process 300 can associate the received image-related information with the user account authenticated on the user device. For example, process 300 can store the received image-related information in a database indexed by user account, user device, and/or presentation device. In a more particular example, an instruction to store image-related information from a client application executing on the user device can cause a representation of the image that was presented on the media presentation device, image identifying information, and metadata associated with the image to be stored in association with a user identifier, identifying information related to the media presentation device, and/or other suitable information such that, in response to receiving a subsequent request for supplemental information related to images of interest that have been presented on the media presentation device, a service can retrieve and/or determine image-related information to present on the user device. In another more particular example, in response to receiving a confirmation from the user of the user device to store image-related information corresponding to an image that was presented on the media presentation device, a request to store image-related information that includes a user identifier (e.g., user account credentials), an image identifier, and metadata associated with the image of interest can be transmitted to a server.

Noted that in some implementations in which the mechanisms described herein collect information about a particular user, the user can be provided with an opportunity to control whether the mechanisms collect information about particular users and/or how collected user information is used by the mechanisms. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the mechanisms described herein can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the mechanisms described herein.

In some implementations, a portion of the metadata can be selected from the received metadata that is associated with the presented image. For example, based on user interests and previous user selections associated with the user account, a portion of the metadata can be selected for storage, where the portion of metadata is used to generate a user interface for navigating through stored image information.

It should be noted that selecting metadata or other image-related information for storage can be based on any suitable criterion. For example, user preferences, which may include a user's stated interests, a user's implied interests, media content that the user has consumed, media content and/or products about which the user has commented on and/or that the user has rated, and/or any other suitable information about the user, can be used to selected particular metadata for storage in association with a user account. In another example, a user's implied interests, which may be based on user actions such as what types of media content the user consumes, what types of products the user buys, the user's actions with relation to the content and/or products (e.g., whether the user is engaged with the content/product by commenting and/or "liking" the content/product, a rating given to the content/product, etc.), can be used to selected particular metadata for storage in association with a user account. In some implementations, a user can be given an opportunity to determine which information is used in determining user preferences. For example, in some implementations, user preferences can be manually entered by a user. As another example, in some implementations, a user can select one or more sources of information that may or may not be used in determining user preferences.

In some implementations, in response to storing the image-related information in a database indexed by user account, a confirmation message can be transmitted to the application executing on the user device. Upon receiving the confirmation message, the application executing on the user device can present an interface indicating that the user-related information has been stored (e.g., "Image Saved"). Additionally or alternatively, an interface indicating that the user-related information has been stored can be presented on the media presentation device.

At 370, process 300 can present a user interface that allows a user of the user device to navigate through stored metadata and/or other image-related information associated with one or more images of interest that have been presented on a media presentation device. For example, the database of image-related information can be accessed and used to create an interface where the user can scroll through image-related information pertaining to images that the user of the user account has indicated an interest.

Figure 5:
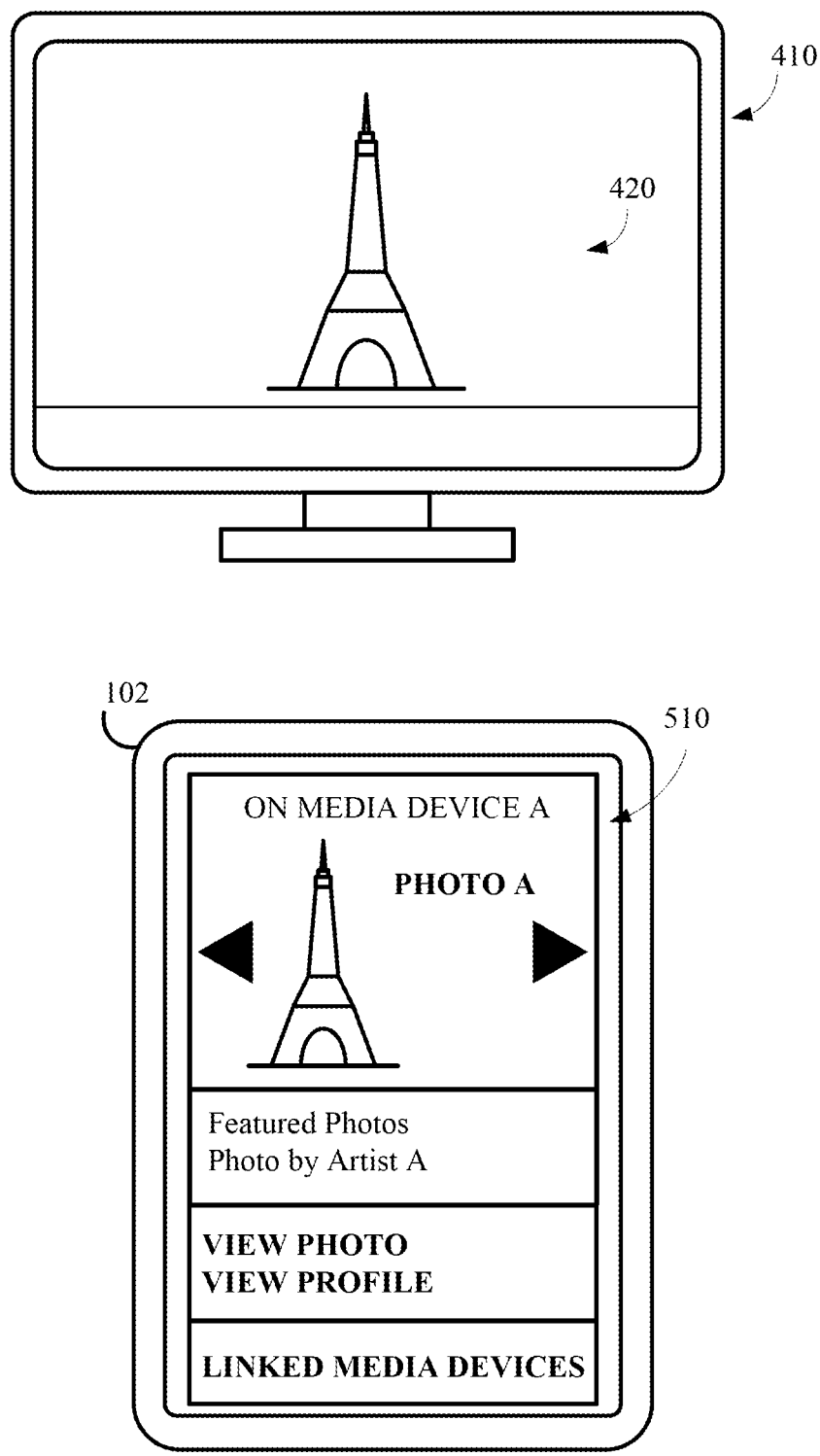
FIG. 5 shows an example of a display device presenting content and a user device presenting a user interface for navigating through saved image-related information in accordance with some implementations of the disclosed subject matter.

In a more particular example, FIG. 5 shows an illustrative example of display device 410 that had presented image 420 and mobile device 102 presenting a user interface 510 for navigating through saved image-related information. For example, upon detecting that a particular client application has been launched or otherwise determining that a request to review saved image-related information has been received, a user interface 510 can be generated based on data associated with the user account authenticated on mobile device 102 from an image database and user interface 510 can be presented on a display of mobile device 102. As shown in FIG. 5, user interface 510 can include a representation of the image of interest that was presented on display device 410 (e.g., Photo A), image-related information or image metadata retrieved from the image database (e.g., title information, artist information, a link to a page containing the image, a link to a user profile corresponding to the artist or owner, and a selectable list of media presentation devices. In continuing this example, user interface 510 can be used to navigate through images that have been presented on a particular media presentation device in which the corresponding user command was received.

In some implementations, user interface 510 can allow the user to select from multiple media presentation devices that the user of mobile device 102 has associated with. In response, mobile device 102 can present a user interface 510 that includes images and other media content that has been presented on that particular media presentation device. Additionally or alternatively, the user of mobile device 102 can indicate that user interface 510 is to include images and other media content information from all media presentation devices.

In some implementations, process 300 can determine one or more actions to be performed by the user device based on interaction with user interface 510. For example, if the presented content includes an image of a painting, a user selection of user interface 510 can retrieve web pages, news articles, and/or any other suitable content related to the painting, the artist of the painting, etc., by performing a search based on the metadata related to the painting. In some implementations, using the information from the web pages, news articles, and/or any other suitable content relating to the presented content, the server can obtain a larger set of keywords relating to the presented content to determine an action that may be of interest to the user of the user device.

The server can transmit a response to the user device for presenting the action associated with the user interface. In some implementations, the response can include any suitable data that can be used to present the action. For example, the response can include a link (e.g., a uniform resource locator (URL)), a barcode (e.g., a quick response (QR) code), and/or any other suitable mechanism directed to a web page including information related to the presented content, etc. As another example, the metadata can include a snippet of web content (e.g., a web page, text, video, etc.) related to the presented content.

In some implementations, the client application can receive the response. In some implementations, the client application can cause the action related to the presented content to be performed by user device 102. In some implementations, the action can include presenting content using text, images, icons, graphics, videos, animations, audio clips, hypertext, hyperlinks, sounds, and/or any other suitable content.

In some implementations, user interface 510 can include a selectable option to resume or return to the video content at a playback time or the image in the sequence of images corresponding to the time stamp that the user command was received. For example, the selection of the selectable option by the user of the mobile device can cause the mobile device to transmit an instruction to the media playback device to resume playback of a particular media content item at a particular time (e.g., by requesting the media content item, selecting a particular playback time, and casting the content to the media playback device). In another example, the selection of the selectable option by the user of the mobile device can cause the mobile device to transmit an instruction to the media playback device to display the image in the sequence of images that was being presented at the time that the user command was received.

Figure 6:
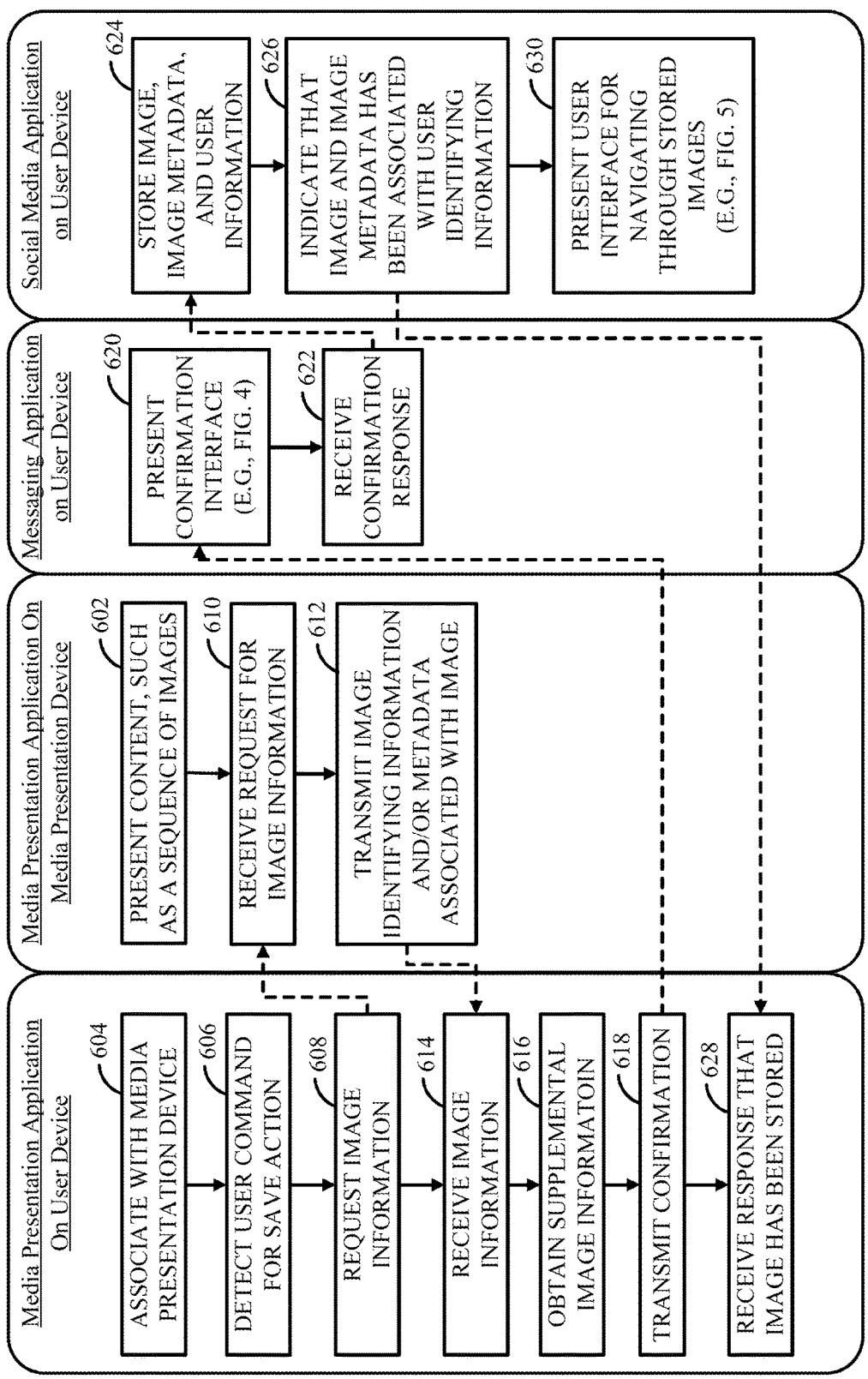
FIG. 6 shows an example of a data flow that can be used in processes of FIG. 3 among a presentation device, a user device, and one or more servers in accordance with some implementations of the disclosed subject matter.

FIG. 6 shows a diagram illustrating an example 600 of a data flow that can be used in processes of FIG. 3 among a presentation device 110, user device 102, and one or more servers 120 in accordance with some implementations of the disclosed subject matter.

At 602, a media presentation application executing on media presentation device 110 can present content on a display associated with media presentation device 110. For example, such content can include a slideshow of images in response to determining that media presentation device 110 is in a suitable operating mode, such as a background mode. In a more particular example, in response to detecting that a background mode is currently active on media presentation device 110, media presentation device 110 can request particular media content from a content server to be presented on media presentation device 110—e.g., a slideshow of selected photographs, a slideshow of photographs stored in association with a user account of media presentation device 110, etc. In another more particular example, in response to detecting that media presentation device 110 is operating in an active mode, media presentation device 110 can request particular media content from a content server to be presented on media presentation device 110—e.g., video content, on-demand video content, audio content, etc.

At 604, a media presentation application executing on user device 102 can associate with media presentation device 110. For example, in response to launching a media presentation application on user device 102, the media presentation application can identify media presentation devices, such as media presentation device 110. These can include, for example, media presentation devices that user device 102 has previously associated with and/or media presentation devices that are connected to a same local network as user device 102.

Alternatively, media presentation device 110 can identify user devices, such as user device 102, that are present and receive user device identifying information of present user devices. Media presentation device 110 can identify user devices that are present using any suitable technique or combination of techniques. For example, as described above, media presentation device 110 can detect user devices that are connected to a same local network as media presentation device 110. In some implementations, a user device can be determined to be present based on any suitable criterion or combination of criteria, such as if the user device responds to a message sent by media presentation device 110.

At 606, the media presentation application executing on user device 102 can capture audio data using an audio input device (e.g., a microphone on user device 102). The media presentation application can detect that a user command for saving image-related information for an image being displayed on media presentation device 110 has been received. As described above, the media presentation application executing on user device 102 can detect a particular sequence of words to initiate the storage of image-related information (e.g., "OK device, save this image").

At 608, in response to detecting the receipt of the corresponding user command for saving image-related information for an image being displayed on media presentation device 110, the media presentation application executing on user device 102 can transmit a request for image information to media presentation device 110. For example, the transmitted request can include timing information as to when the user command was received.

In response to receiving the request for image information at 610, media presentation device 110 can transmit an image identifier or any suitable image identifying information, metadata, and other image-related information corresponding to the image that was presented on media presentation device 110 at 612. For example, media presentation device 110 can transmit a response to user device 102, where the response includes an image URL associated with the presented image, keywords that describe the presented image, links to contact in which the presented image is discussed, artist information associated with the presented image, etc. The media presentation application executing on user device 102 can receive the image-related information at 614.

Metadata can contain any suitable information relating to the presented content, such as one or more topics related to the presented content, information about the type of information contained in the presented content (e.g., an image, a video, a file type, etc.), information about the subject of the presented content (e.g., a description of what is depicted in an image), a source where the presented content originates (for example, a social media post, a web page, a URI, etc.), information about one or more users related to the presented content (e.g., a user that appears in a photo), information about one or more authors of the presented content, etc. In a more particular example, when the media content presented on the media presentation device is a landscape photograph, the metadata can include an image uniform resource locator, a location of where the photograph was taken, and artist information associated with the user that captured the photograph. In another more particular example, when the media content presented on the media presentation device is an image from a news article, the metadata can include a uniform resource locator to the news article, keywords associated with the content contained in the news article, a source that published the news article, and links to content that is related to the news article. In yet another more particular example, when the media content presented on the media presentation device is a food image from a social sharing service, the metadata can include an image uniform resource locator, a link to a recipe for making the food shown in the food image, a link to comments that have been provided on the social sharing service in response to the publication of the food image, and a link to related recipes.

Alternatively, the media presentation application executing on media presentation device 110 can capture audio data using an audio input device (e.g., a microphone connected to media presentation device 110). The media presentation application can detect that a user command for saving image-related information for an image being displayed on media presentation device 110 has been received and, in response, transmit image identifying information, metadata, and/or any other image-related information to the media presentation application executing on user device 110.

In some implementations, at 616, the media presentation application executing on user device 102 can obtain supplemental image information based on the received image-related information. For example, upon receiving image identifying information and metadata associated with the presented image from media presentation device 110, a request for supplemental content corresponding to the image that was presented on the media presentation device can be transmitted, where the request includes the metadata and the image identifying information as search terms. In response to the request, the search results or supplemental image information from the one or more search results can be appended to the image-related information received from media presentation device 110.

At 618, the media presentation application executing on user device 102 can cause a confirmation to be presented via a confirmation interface at 620. For example, a messaging application executing on user device 102 or any other suitable application can present a confirmation interface, such as the one shown in FIG. 4. The confirmation interface can, for example, provide the user of user device 102 with an opportunity to cancel or confirm an interest in an image presented on media presentation device that corresponds with the received user command.

At 622, a confirmation response can be received using the messaging application executing on user device 102. For example, the confirmation response can be an indication to not save the image-related information and, in response, the image storage process can end. In another example, the confirmation interface can indicate that the image storage process will continue unless user interaction with the confirmation interface is received (e.g., a user selection of the confirmation interface) and, in response to not detecting such user interaction within a given period of time, the confirmation response can include transmitting the image, image identifying information, metadata corresponding to the image, supplemental content corresponding to the image, and/or any other suitable image-related information in association with user identifying information.

At 624, in response to receiving the storage request, the image, supplemental content corresponding to the image, and/or any other suitable image-related information can be stored in an image database in association with user identifying information. For example, a social media application executing on user device 102 can receive the request and can create an album that stores a representation of the image and the image-related information in an image database that is indexed by user identifying information. It should be noted that any suitable application executing on user device 102 can be used to store image-related information associated with images of interest identified by the user of user device 102.

In some implementations, in response to storing the image-related information along with user identifying information in the image database, the social media application on user device 102 can transmit a confirmation indication that the image and the image-related information can be stored in association with user identifying information in the image database at 626. The confirmation indication can be transmitted back to media presentation application or any other suitable application executing on user device 102. In response to receiving a confirmation response that the image and its associated image-related information has been stored at 628, a confirmation message can be presented on user device 102 and/or media presentation device 110 at 630 (e.g., the message "image saved" along with a representation of the image can be presented as a notification on user device 102).

At 640, in response to storing the image-related information and/or receiving a request to review saved image information, the social media application or any other suitable application executing on user device 102 can present a user interface for navigating through saved image information, such as the user interface shown in FIG. 5. For example, in response to receiving a request to review image information related to images of interest that have been presented on the media presentation device, a service can retrieve and/or determine image-related information to present on the user device and generate a suitable user interface.

Such a user interface can allow the user of user device 102 to scroll through multiple representations of images of interest that have been presented on one or more media presentation devices. Each image representation can be presented along with at least a portion of the image-related information.

In some implementations, the user interface can include an option to share an image of interest with other users (e.g., users connected to the user of user device 102 via a social sharing service).

In some implementations, the mechanisms described herein can include software, firmware, hardware, or any suitable combination thereof. For example, the mechanisms described herein can encompass a computer program written in a programming language recognizable by one or more of hardware processors 202, 212 and 222 (e.g., a program written in a programming language, such as, Java, C, Objective-C, C++, C#, JavaScript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In situations in which the mechanisms described herein collect personal information about users, or can make use of personal information, the users can be provided with an opportunity to control whether programs or features collect user information (e.g., information about cached device details on a user's user device, devices discovered on networks to which the user device is connected, an address from which a database query is sent, a social network, social actions or activities, profession, a user's preferences, or a user's current location), or to control whether and/or how to receive content from the server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined.

Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 3, 5, and 6 can be executed or performed in any order or sequence not limited to the order and sequence shown and described in the figures. Also, some of the above steps of the process of FIGS. 3, 5, and 6 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for storing information associated with content presented on a media presentation device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for obtaining information relating to presented content, the method comprising:
   determining that a mobile device is associated with a media presentation device over a communications network, wherein the media presentation device is in an operating mode that presents a sequence of images;
   receiving a user command that indicates interest in an image from the sequence of images being presented on the media presentation device;
   determining metadata associated with the image from the sequence of images being presented on the media presentation device;
   causing the metadata associated with the image to be stored with a representation of the image from the sequence of images and a user account identifier corresponding to a user of the mobile device;
   receiving a request to review saved image information corresponding to one or more images in which the user command indicative of interest has been received; and
   in response to receiving the request, causing a user interface element to be presented that allows a user of the mobile device to navigate through the saved image information, wherein the user interface element includes at least the representation of the image from the sequence of images and information relating to the image from the sequence of images.

2. The method of claim 1, further comprising determining the operating mode of the media presentation device, wherein the sequence of images is caused to be presented on the media presentation device in response to determining that the operating mode of the media presentation device is a background mode and wherein media content is caused to be presented on the media presentation device in response to determining that the operating mode of the media presentation device is a playback mode.

3. The method of claim 1, further comprises receiving an indication that the mobile device is associated with the media presentation device over a wireless communications network.

4. The method of claim 1, wherein receiving the user command that indicates interest in the image from the sequence of images further comprises:
   receiving, using an audio input device, audio data that includes ambient sounds in an environment in which the sequence of images is being presented; and
   identifying a voice input that includes a particular sequence of words from the audio data that corresponds to a request to obtain information associated with the image being presented on the media presentation device.

5. The method of claim 1, wherein determining the metadata associated with the image from the sequence of images being presented on the media presentation device further comprises:
   obtaining timing information associated with the received user command;
   transmitting, to the media presentation device, a request for image information associated with the image being presented on the media presentation device based on the timing information;
   receiving, from the media presentation device, the image information; and
   transmitting a search query for supplemental content, wherein the search query includes the image information.

6. The method of claim 5, further comprising causing a confirmation interface to be presented that confirms the interest in the image from the sequence of images being presented on the media presentation device, wherein the confirmation interface causes the request for image information to be transmitted to the media presentation device.

7. The method of claim 1, further comprising selecting a subset of metadata from the metadata associated with the image, wherein the subset of metadata and an image identifier that corresponds to the representation of the image are stored in a table associated with the user account identifier.

8. The method of claim 1, wherein receiving the request to review saved image information further comprises determining that a browser interface authenticated with credentials corresponding to the user account identifier has been accessed, wherein the user interface elements is caused to be presented in the browser interface.

9. The method of claim 8, further comprising:
   receiving a user selection of the user interface element that is presenting the representation of the image from the sequence of images and the information relating to the image from the sequence of images; and
   causing the browser interface to access a source of the information relating to the image.

10. A system for obtaining information relating to presented content, the system comprising:
a hardware processor that is configured to:
determine that a mobile device is associated with a media presentation device over a communications network, wherein the media presentation device is in an operating mode that presents a sequence of images;
receive a user command that indicates interest in an image from the sequence of images being presented on the media presentation device;
determine metadata associated with the image from the sequence of images being presented on the media presentation device;
cause the metadata associated with the image to be stored with a representation of the image from the sequence of images and a user account identifier corresponding to a user of the mobile device;
receive a request to review saved image information corresponding to one or more images in which the user command indicative of interest has been received; and
in response to receiving the request, cause a user interface element to be presented that allows a user of the mobile device to navigate through the saved image information, wherein the user interface element includes at least the representation of the image from the sequence of images and information relating to the image from the sequence of images.

11. The system of claim 10, wherein the hardware processor is further configured to determine the operating mode of the media presentation device, wherein the sequence of images is caused to be presented on the media presentation device in response to determining that the operating mode of the media presentation device is a background mode and wherein media content is caused to be presented on the media presentation device in response to determining that the operating mode of the media presentation device is a playback mode.

12. The system of claim 11, wherein the hardware processor is further configured to receive an indication that the mobile device is associated with the media presentation device over a wireless communications network.

13. The system of claim 11, wherein the hardware processor is further configured to:
receive, using an audio input device, audio data that includes ambient sounds in an environment in which the sequence of images is being presented; and
identify a voice input that includes a particular sequence of words from the audio data that corresponds to a request to obtain information associated with the image being presented on the media presentation device.

14. The system of claim 11, wherein the hardware processor is further configured to:
obtain timing information associated with the received user command;
transmit, to the media presentation device, a request for image information associated with the image being presented on the media presentation device based on the timing information;
receive, from the media presentation device, the image information; and
transmit a search query for supplemental content, wherein the search query includes the image information.

15. The system of claim 14, wherein the hardware processor is further configured to cause a confirmation interface to be presented that confirms the interest in the image from the sequence of images being presented on the media presentation device, wherein the confirmation interface causes the request for image information to be transmitted to the media presentation device.

16. The system of claim 11, wherein the hardware processor is further configured to select a subset of metadata from the metadata associated with the image, wherein the subset of metadata and an image identifier that corresponds to the representation of the image are stored in a table associated with the user account identifier.

17. The system of claim 11, wherein the hardware processor is further configured to determine that a browser interface authenticated with credentials corresponding to the user account identifier has been accessed, wherein the user interface elements is caused to be presented in the browser interface.

18. The system of claim 17, wherein the hardware processor is further configured to:
receive a user selection of the user interface element that is presenting the representation of the image from the sequence of images and the information relating to the image from the sequence of images; and
cause the browser interface to access a source of the information relating to the image.

19. A non-transitory computer-readable medium containing computer executable instructions that, when executed by a processor, cause the processor to perform a method for obtaining information relating to presented content, the method comprising:
determining that a mobile device is associated with a media presentation device over a communications network, wherein the media presentation device is in an operating mode that presents a sequence of images;
receiving a user command that indicates interest in an image from the sequence of images being presented on the media presentation device;
determining metadata associated with the image from the sequence of images being presented on the media presentation device;
causing the metadata associated with the image to be stored with a representation of the image from the sequence of images and a user account identifier corresponding to a user of the mobile device;
receiving a request to review saved image information corresponding to one or more images in which the user command indicative of interest has been received; and
in response to receiving the request, causing a user interface element to be presented that allows a user of the mobile device to navigate through the saved image information, wherein the user interface element includes at least the representation of the image from the sequence of images and information relating to the image from the sequence of images.

* * * * *